United States Patent
Kazi et al.

(10) Patent No.: US 11,927,180 B2
(45) Date of Patent: Mar. 12, 2024

(54) MULTI-STABLE ACTUATOR BASED ON SHAPE MEMORY ALLOY WIRES

(71) Applicant: ACTUATOR SOLUTIONS GMBH, Gunzenhausen (DE)

(72) Inventors: Arif Kazi, Aalen (DE); Markus Köpfer, Stoedtlen-Regelsweiler (DE); Markus Bäuml, Gunzenhausen (DE); Neven Bobic, Gunzenhausen (DE); Michael Honold, Aalen (DE)

(73) Assignee: ACTUATOR SOLUTIONS GMBH, Gunzenhausen (DE)

( * ) Notice: Subject to any disclaimer, the term of this patent is extended or adjusted under 35 U.S.C. 154(b) by 219 days.

(21) Appl. No.: 17/431,726

(22) PCT Filed: Mar. 10, 2020

(86) PCT No.: PCT/IB2020/052056
§ 371 (c)(1),
(2) Date: Aug. 18, 2021

(87) PCT Pub. No.: WO2020/183360
PCT Pub. Date: Sep. 17, 2020

(65) Prior Publication Data
US 2022/0136488 A1   May 5, 2022

(30) Foreign Application Priority Data
Mar. 12, 2019   (IT) .................. 102019000003589

(51) Int. Cl.
*F03G 7/06* (2006.01)
*G02B 6/38* (2006.01)

(52) U.S. Cl.
CPC ..... *F03G 7/06143* (2021.08); *F03G 7/06147* (2021.08); *F03G 7/0665* (2021.08);
(Continued)

(58) Field of Classification Search
None
See application file for complete search history.

(56) References Cited

U.S. PATENT DOCUMENTS

2005/0115235 A1   6/2005   Mernoe
2008/0271559 A1   11/2008  Garscha et al.
(Continued)

FOREIGN PATENT DOCUMENTS

EP   0895885 A2   2/1999
EP   3650691 A1   5/2020
(Continued)

OTHER PUBLICATIONS

International Search Report and Written Opinion dated Jun. 5, 2020 in PCT/IB2020/052056, 11 pages.
(Continued)

*Primary Examiner* — Mark T Monk
(74) *Attorney, Agent, or Firm* — Element IP, PLC (57) ABSTRACT

Multi-stable SMA actuator comprising two shape memory alloy wires (1, 2) in antagonistic configuration that allow to define multiple stable positions of a movable element (12), said positions being maintained by movable stoppers to lock the movable element, that do not require power and are disengaged by the shape memory alloy wires (1, 2) upon actuation thereof.

19 Claims, 8 Drawing Sheets

(52) U.S. Cl.
CPC .... *G02B 6/3859* (2013.01); *F05B 2280/5006* (2013.01); *G03B 2205/0076* (2013.01)

(56) References Cited

U.S. PATENT DOCUMENTS

2016/0329801 A1\* 11/2016 Hu .......................... G02B 7/09
2017/0158173 A1\* 6/2017 Kotani ..................... B60S 1/18

FOREIGN PATENT DOCUMENTS

| GB | 2450793 A | 1/2009 |
| JP | 2016515677 A | 5/2016 |
| WO | WO-2014162234 A2 | 10/2014 |

OTHER PUBLICATIONS

Written Opinion of the International Preliminary Examining Authority dated Feb. 26, 2021 in PCT/IB2020/052056, 6 pages.
Combined Taiwanese Office Action and Search Report dated Aug. 28, 2023 in corresponding Taiwanese Patent Application No. 109108000 (with English translation), 20 pages.

\* cited by examiner

MULTI-STABLE ACTUATOR BASED ON SHAPE MEMORY ALLOY WIRES

The present invention is inherent to a multi-stable shape memory alloy (SMA) actuator exploiting the property of shape memory alloy wires used in antagonistic configuration. Generally speaking, actuators based on shape memory alloy wires present various advantages such as reduced encumbrance, weight, power consumption, all of the above leading to the possibility of achieving a high degree of miniaturization or ease of integration in more complex systems/devices.

Some examples of recent SMA wire-based actuators are shown in the US patent applications 2006/9298500, 2005/0160858 and U.S. Pat. No. 7,364,211. All the devices shown in these references suffer from the drawback that the actuator has only two stable positions that a kind of mechanical lock coupled with the SMA active component (the wire) ensures without the need to supply power/current.

A SMA based actuator using two shape memory alloy wires acting in antagonistic configuration on a rotatable and linearly displaceable element is described in the US patent application 2008/0271559. In the described solution the movable element needs to undergo a "spurious"/"parasitic" secondary movement not related to the displacement required for actuation. This characteristic renders the described solution not compatible with the most demanding applications, for example such spurious movement in an optical zoom would lead to a serious deterioration of image quality in camera modules, more specifically image quality would be acceptable only in a locked state of the actuator.

Purpose of the present invention is to provide an actuator based on the use of shape memory alloy wires capable to overcome the limit of the prior art, more specifically not being limited in the number of achievable stable positions while still not requiring any power/current supply for the maintenance of such stable positions, and in a first aspect thereof consists in a shape memory alloy actuator comprising a movable element and a frame, the movable element being driven by at least first (1) and second (2) shape memory alloy wires in an antagonistic configuration and concurrently determining the movable element position, at least a movable lock coupling a surface of the frame with the movable element, the disengagement of said movable lock being controlled by the actuation of at least one of said first and second shape memory alloy wires and its engagement being performed by a restoring force provided by at least one return mechanism upon cooling of the shape memory alloy wires.

The invention will be further illustrated with the help of the following figures where.

In the figures, the size and the dimensional ratios of the various elements shown in some cases have been altered in order to help understanding the drawings, with particular but not exclusive reference to the SMA wire diameter with respect to other elements of the actuator; also, some ancillary elements not necessary for the invention understanding, such as current supply source, wire crimping/fixing elements, etc. have not been shown since they are ordinary means known in the technical field.

A common inventive feature linking all of the embodiments of the present invention is the use of at least two shape memory alloy wires in antagonistic configuration where locking, unlocking and movement of the movable element are determined by the different degree of actuation of the shape memory alloy wires. More specifically if no power supply is provided there is a lock engagement that prevents the movement, while disengagement is given by heating at least one of the shape memory alloy wires, even though the final position is determined by the equilibrium resulting from the different pulling of the SMA wires (i.e. their different degree of actuation resulting from their different temperature). Once at the desired position, concurrent cooling provides for keeping the reached position and at the same time allows for lock engagement due to the action of a return mechanism, and therefore no further actuated mechanism for locking/unlocking the movable element is needed.

Figure 1A:
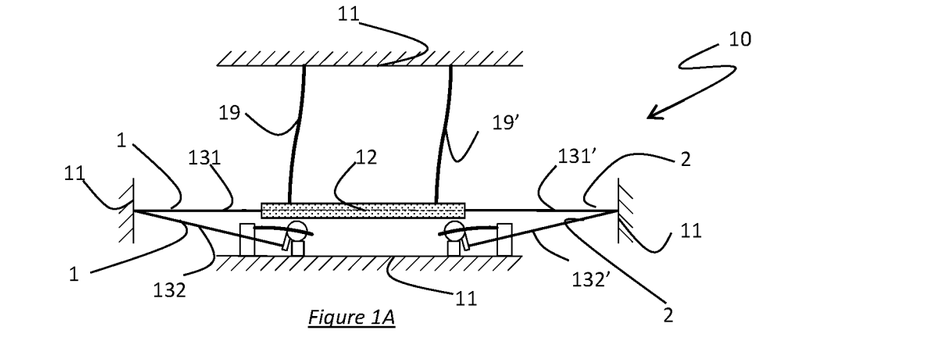
FIGS. 1A and 1B are schematic side views of a first embodiment of an actuator according to the present invention, while schematic side views of a variant of this first embodiment are shown in FIGS. 1C and 1D, FIGS. 2A and 2B are schematic side views of a second embodiment of an actuator according to the present invention.
Figure 1B:
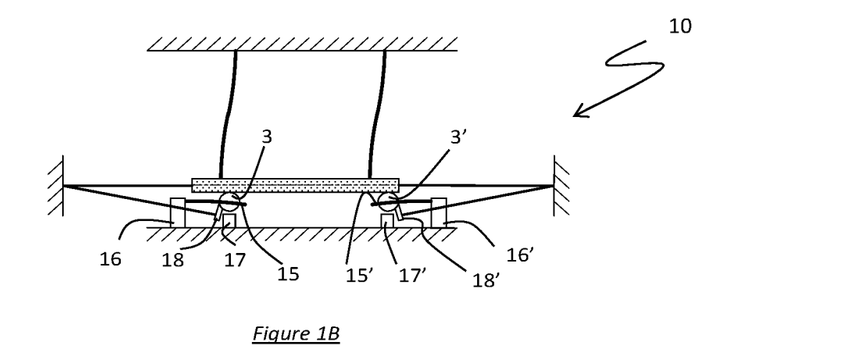

FIGS. 1A and 1B are schematic side views of an actuator 10 according to the present invention, FIG. 1A showing the actuator 10 in an unlocked state, FIG. 1B showing it in the locked state.

Actuator 10 comprises a structural frame 11, a movable element 12, wherein the movable element 12 is driven by two antagonistic SMA wires 1 and 2, in particular by their first segments 131, 131' connecting opposite sides of the movable element 12 with different opposite surfaces of frame 11 to alternately drive it along opposite directions according to the different level of actuation of the shape memory alloy wires 1, 2. In this respect, the more the shape memory alloy wires 1, 2 are in their austenite phase (high temperature) with respect to their martensitic phase (low temperature), the higher the traction they will apply to the movable element 12. Details of operating principles of shape memory alloy wires are widely known to a person of ordinary skill in the art, see for example the paper "Fundamental characteristics and design method for nickel-titanium shape memory", published in 2001 on PERIODICA POLYTECHNICA SER. MECH. ENG. VOL. 45, NO. 1, PP. 75-86.

Flexible elements 19, 19' connect another surface of the stationary frame 11 with the movable element 12, to provide a support to the movable element 12 and also guide it in the travel direction while preventing its motion in other directions.

The actuator locking mechanism is constituted by two movable stoppers 3, 3' that provide a friction-based lock once in contact with the movable element 12, such as in FIG. 1B, while they do not restrain its movement once they are separated from it, as in FIG. 1A. If the second segments 132, 132' of the shape memory alloy wires 1, 2 do not exert a force on the movable stoppers 3, 3' via levers 18, 18', the movable stoppers are in contact with the movable element 12 due to the action of springs 15, 15' connecting holders 16, 16' with levers 18, 18'. The second segments 132, 132' of the shape memory alloy wires, once actuated, pull the movable stoppers 3, 3' away from the movable element 12 and toward resting pillars 17, 17', thus allowing the movement of the movable element 12 driven by the different level of actuation of the shape memory alloy wires 1, 2.

For the sake of clarity, the shape memory alloy wires first segments 131, 131' are the ones running from the movable element 12 to the nearby frame 11, while the shape memory alloy wires second segments 132, 132' run from said frame 11 to the connecting levers 18, 18'.

FIGS. 1A and 1B highlight the key concept of the present invention, namely the fact that it is the activation of the shape memory alloy wires 1 and 2 that determines the unlocking of the movable element 12 by acting on the movable stoppers 3 and 3', whereas the different actuation level of the shape memory alloy, i.e. how much of it is in its austenite phase, will determine the movement (during the temperature transient) and the final position when the pulling wire is at its final temperature. The other wire in antagonistic configuration is kept at least at a minimal actuation level, more specifically at an actuation level lower with respect to the pulling wire, to assure that it will disengage the movable element 12 from the frictional lock 3, 3'. The decoupling of the locking function from the displacement function for the movable element allows for a more precise control of the movable element position, thus rendering it suitable for the more challenging applications such as, for example, optical zoom function, positioning mechanism for a miniature camera (e.g. for surveillance purposes), miniature robot arm, robotic hand, prosthetic devices.

Figure 1C:
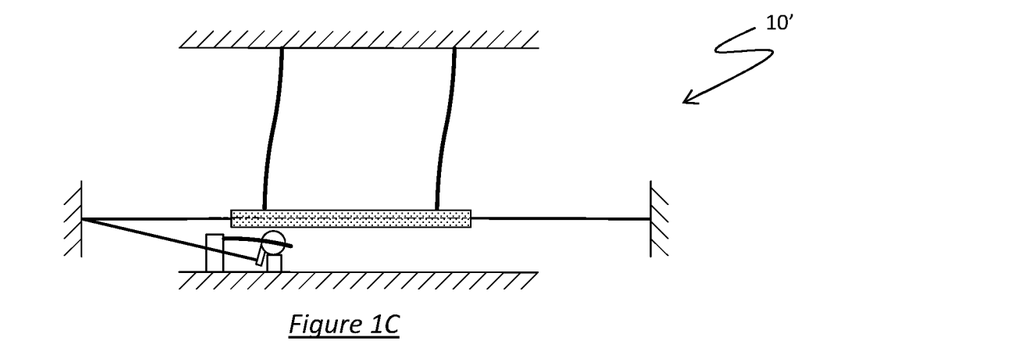
Figure 1D:
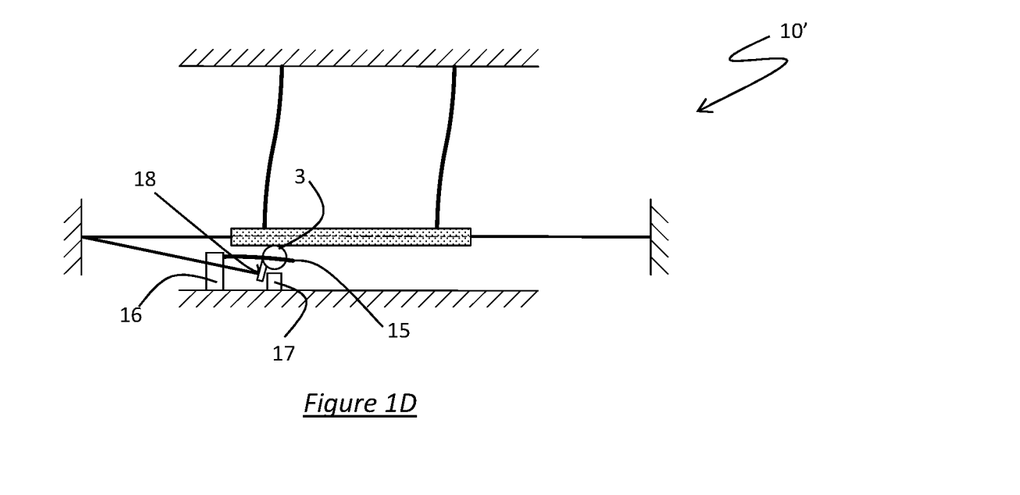

It is to be underlined that an actuator according to the present invention may have only one movable stopper, as shown in the schematic side views of FIGS. 1C and 1D, in which the actuator structure 10' is the same of FIGS. 1A and 1B apart from the presence of only the left braking "block", i.e. the assembly given by the movable stopper 3, spring 15, holder 16, resting pillar 17, lever 18. In this case, only shape memory alloy wire 1, through its second segment 132, is responsible through its actuation for disengaging/displacing the movable stopper 3 from the movable element 12, while the movement of the latter is determined by the different level of actuation of the shape memory alloy wires 1, 2.

As exemplified in the embodiment shown in FIGS. 1C-1D, it is possible that the two antagonistic shape memory alloy wires have different lengths, even though it is preferred for them to be of equal length and diameter (i.e. with a difference/tolerance within ±5%). In the following, all the embodiments that will be described will have antagonistic shape memory alloy wires of equal length, even though this requirement is not an essential feature.

The actuators shown in the schematic views of FIGS. 1A-1B and 1C-1D, and more generally in any of the configurations herein described in which a portion of the SMA wire is dedicated to unlocking by acting on one or more movable stoppers, are typically beneficial for high-stroke solutions as the motion range, linked to a specific dedicated portion of the SMA wire, is not reduced by the self-locking capacity; this means that all of the wire length going from the movable element to the actuator frame contributes to the movable element displacement.

Figure 2A:
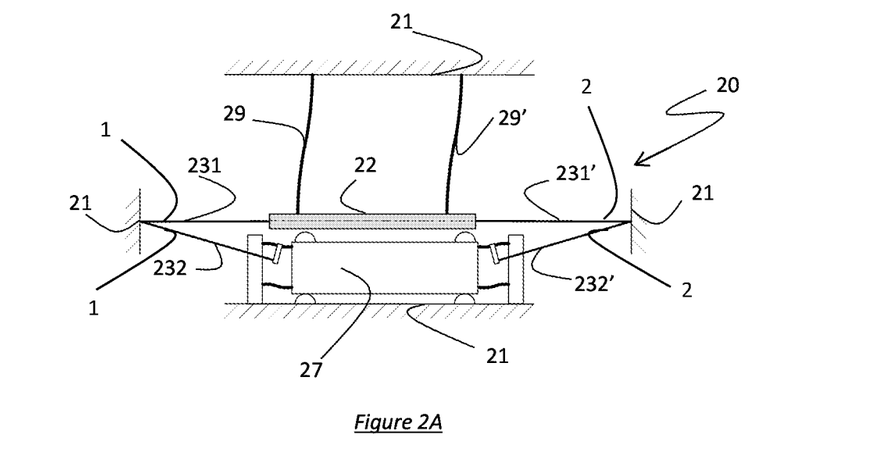
Figure 2B:
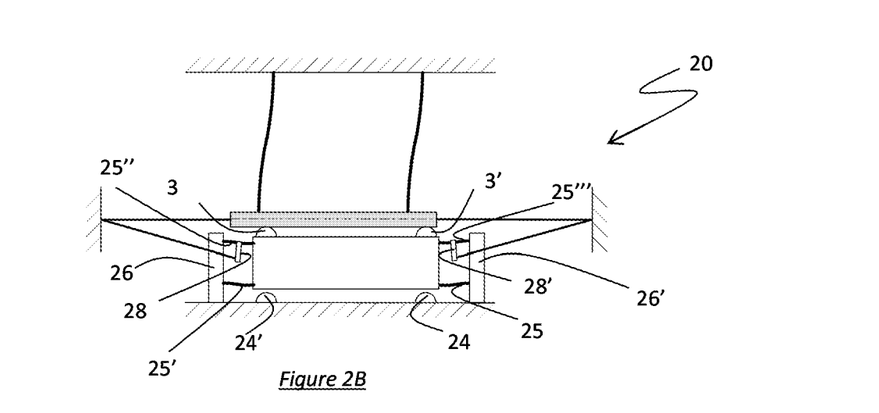

Schematic side views of a second embodiment 20 of an actuator according to the present invention are shown in FIGS. 2A and 2B.

Similarly to actuator 10, actuator 20 comprises a structural frame 21, a movable element 22, wherein the movable element is driven by two antagonistic SMA wires 1 and 2 with first segments 231, 231' connecting opposite sides of movable element 22 with different opposite surfaces of frame 21 to alternatively drive it along opposite directions. Flexible elements 29, 29' connect another surface of stationary frame 21 with movable element 22, to help in supporting it and also to guide it in the direction of travel of the movable element 22 while preventing motion in the other directions.

Actuator 20 further comprises two spacers/resting pillars 24, 24', two frictional stoppers and movable stoppers 3, 3' that are present on the upper surface of a linking element 27 that ensures a synchronous action of the frictional movable stoppers 3, 3' even when only one of the two shape memory alloy wires 1, 2 is only partially actuated. Four lateral springs 25, 25', 25", 25''' connect the linking element 27 to holders 26, 26' similarly to springs 15, 15' and holders 16, 16' of the first embodiment.

Vertical positioning of the linking element 27 is regulated by levers 28, 28' controlled by the second segments 232, 232' of the shape memory alloy wires, said levers 28, 28' acting on the two upper springs 25" and 25', whereas the other two lower springs 25, 25' are not lever-controlled and help in guiding the linking element 27 in a direction perpendicular to the displacement of the movable element 22 to prevent a rotation of the linking element 27. FIG. 2A represent a situation where no "braking" force is applied to movable element 22, with linking element 27 resting on spacers 24, 24', while FIG. 2B represent a situation where linking element 27 is driven to contact the movable element 22, via movable stoppers 3 and 3', and therefore applies a frictional and restraining force to movable element 22. In this case, the locking/unlocking of the movable element 22 is achieved through the combined action of linking element 27 with movable stoppers 3 and 3', springs 25, 25', 25", 25''', levers 28, 28' and holders 26, 26'.

Figure 3A:
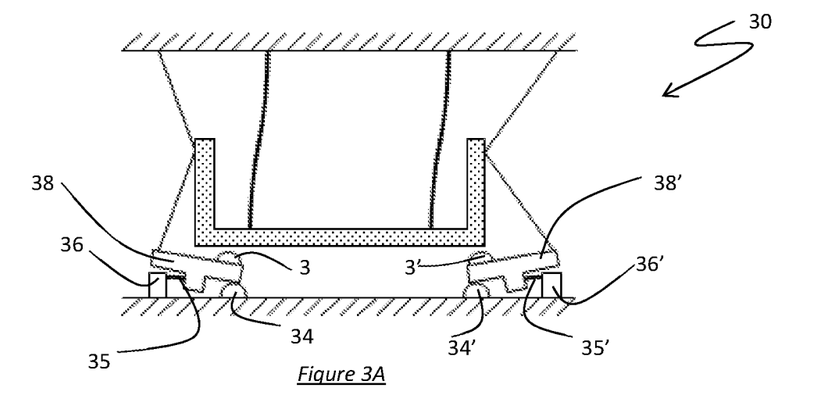
FIGS. 3A and 3B are schematic side views of a third embodiment of an actuator according to the present invention.
Figure 3B:
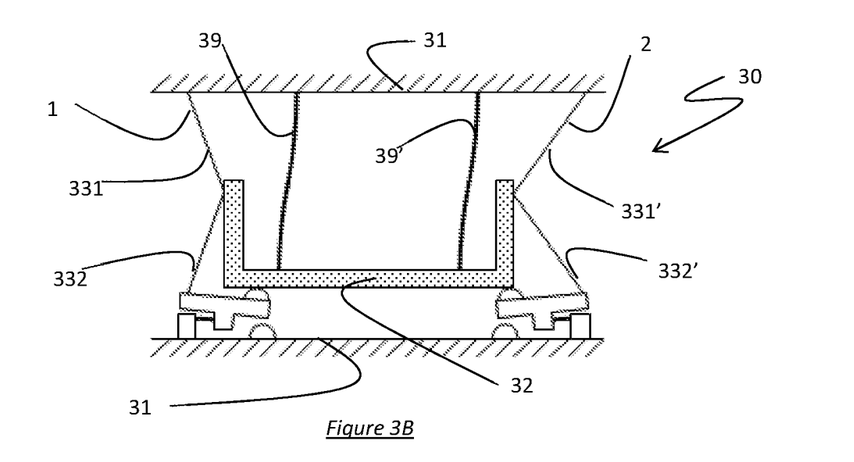

A third embodiment according to the present invention is shown in the schematic views of FIGS. 3A and 3B. In this case actuator 30 comprises a movable element 32 connected to two antagonistic shape memory alloy wires 1, 2, each having a first segment 331, 331' and a second segment 332, 332'. First segments 331, 331' connect the movable element 32 with a surface of the actuator frame 31 above it, while second segments 332, 332' connect the movable element 32 with levers 38, 38' below it, that are connected to holders 36, 36' through springs 35, 35'.

If the shape memory alloy wires 1, 2 are not actuated, the movable frictional stoppers 3 and 3' (located on top of levers 38, 38' at the internal edge thereof) block the displacement of the movable element 32 (FIG. 3B), while once the shape memory alloy wires 1, 2 are actuated, under the traction of their second segments 332, 332', they raise the external edge of levers 38, 38' moving away the frictional stoppers 3 and 3' from the movable element 32 (FIG. 3A), while levers 38, 38' respectively get in contact with end stop elements 34, 34'. These element 34, 34' are analogous to the resting pillars 17, 17' of FIG. 1 and spacers 24, 24' of FIG. 2. Also in this embodiment, two vertical flexible elements 39, 39' guide the movable element 32 in the direction of travel while preventing movements in unwanted directions (i.e. to avoid rotation).

Figure 4A:
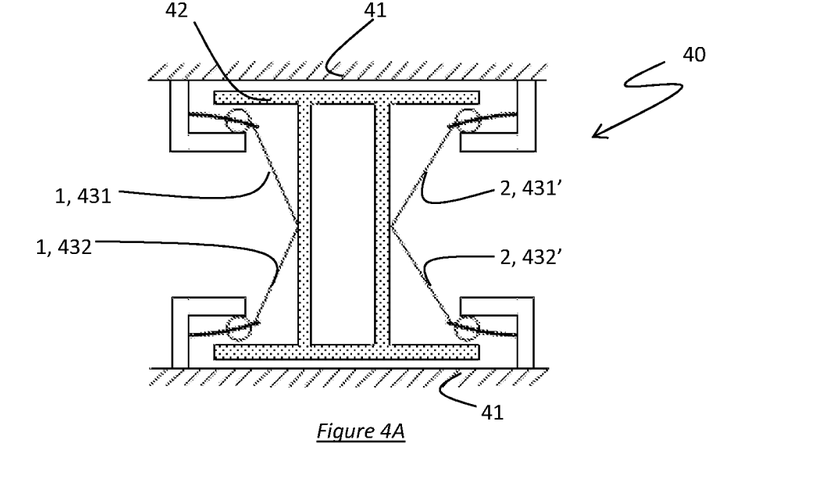
FIGS. 4A and 4B are schematic side views of a fourth embodiment of an actuator according to the present invention.
Figure 4B:
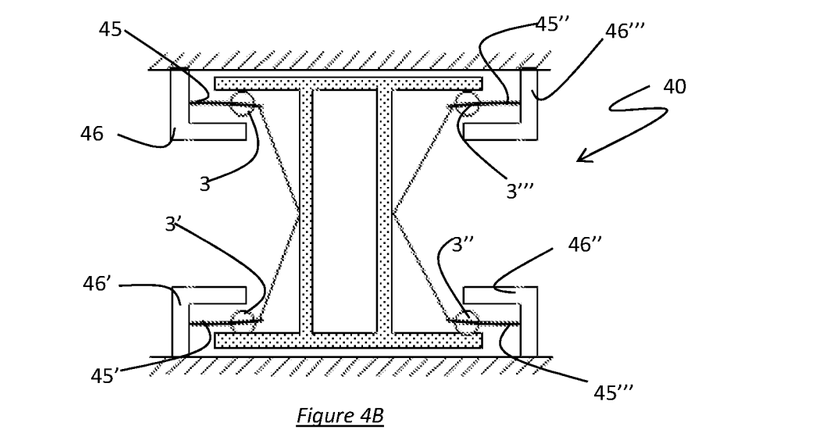

A fourth embodiment according to the present invention is shown in the schematic views of FIGS. 4A and 4B. In this case actuator 40 comprises a movable element 42 driven by two antagonistic shape memory alloy wires 1, 2 whose central points are connected to the movable element 42 while their extremities are each connected respectively to springs 45, 45', 45", 45''' each carrying a movable stopper 3, 3,' 3", 3'''. In this specific configuration, therefore, no parts of the shape memory alloy wires 1, 2 are connected directly to the actuator frame 41 but they are connected thereto via springs 45, 45', 45", 45''' and holders 46, 46', 46", 46''' on which said springs are mounted.

In this embodiment each SMA wire 1, 2 has a first segment 431, 431' and a second segment, 432, 432' that both act on the movable element determining its final position according to the different actuation levels of the shape memory alloy wires 1, 2 while also disengaging (FIG. 4A) the movable frictional stoppers 3, 3', 3", 3''' by bringing them in contact with a holder 46, 46', 46", 46'''. The engagement position of FIG. 4B obviously results from the action of springs 45, 45', 45", 45''' upon cooling of the SMA wires 1, 2.

The present invention is also meant to encompass rotational actuators, i.e. actuators that cause a movable (rotatable) element to rotate under the action of antagonistic shape memory alloy wires and exploiting the same inventive concept of the present invention. In other words, the actuation of the shape memory alloy wires determines the unlocking of the movable (rotatable) element, whereas the different shape memory alloy actuation levels, i.e. how much of it is in its austenite phase, will determine direction and degree of rotation (during the temperature transient) and final position when the wires are at their set temperature, locking in said position when the wires are concurrently cooled to have lock engagement.

Figure 5A:
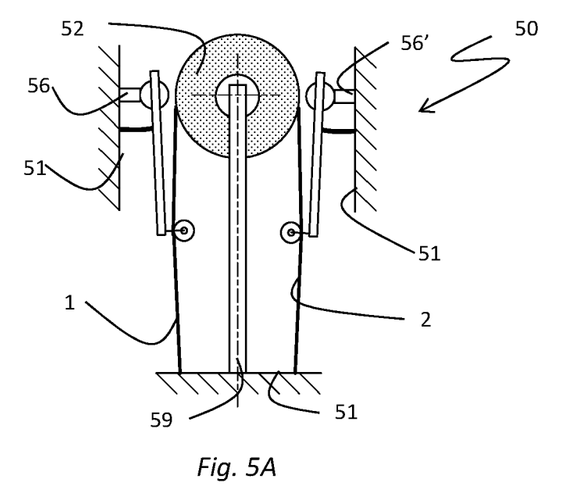
FIGS. 5A and 5B are schematic side views of a fifth embodiment of an actuator according to the present invention.
Figure 5B:
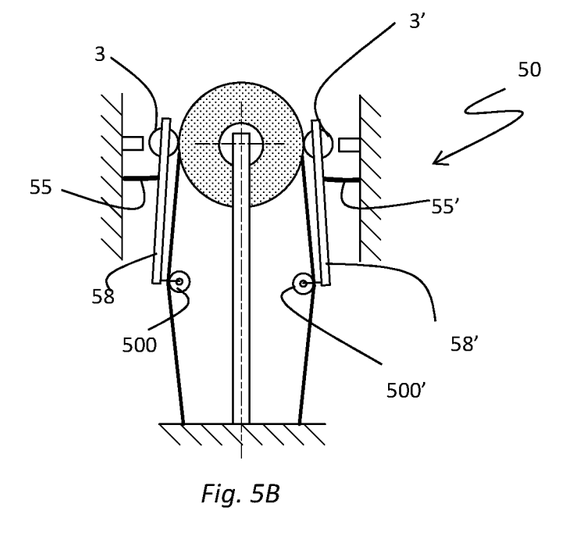

An exemplary embodiment of a rotatable actuator according to the present invention is shown in the schematic side views of FIGS. 5A and 5B. Actuator 50 comprises a roller 52 (movable element) connected to two antagonistic shape memory alloy wires 1, 2 connected in an unsegmented configuration to opposite sides of roller 52 and to a surface of actuator frame 51 on which roller 52 is mounted via a support 59.

Two levers 58 and 58' are mounted on opposite side surfaces of frame 51 via springs 55, 55' and are provided with movable stoppers 3, 3' at a top end adjacent to roller 52 and with rolling pins 500, 500' at a bottom end. The shape memory alloy wires 1, 2 are interposed respectively between levers 58, 58' and rolling pins 500, 500' such that, when they are actuated, they move stoppers 3, 3' away from roller 52 and toward resting pillars 56, 56' to reach the unlocking position of FIG. 5A. Upon cooling of the SMA wires 1 and 2, the movement of levers 58, 58' is controlled by springs 55, 55' to restore the locking position of FIG. 5B.

Figure 6A:
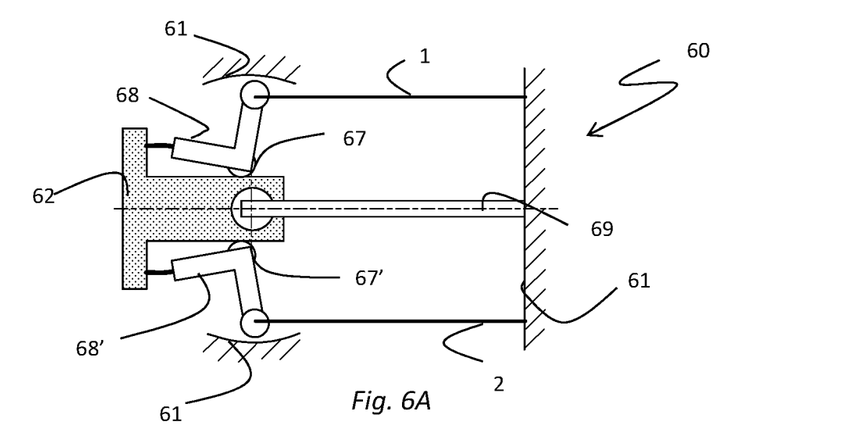
FIGS. 6A and 6B are schematic side views of a sixth embodiment of an actuator according to the present invention.
Figure 6B:
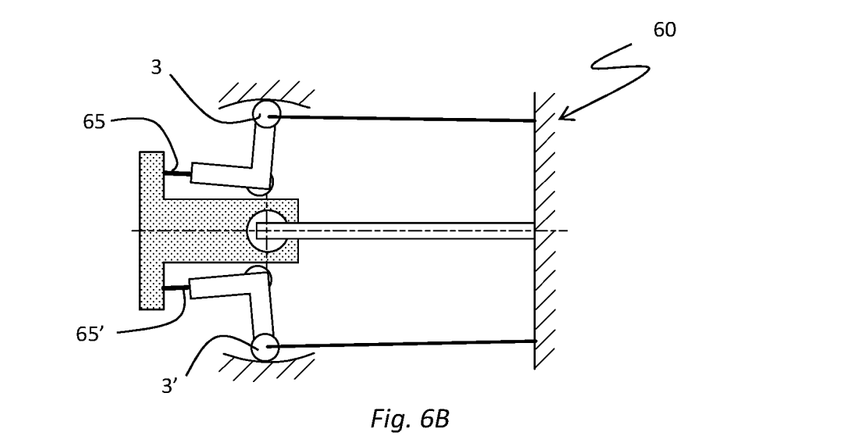

A sixth embodiment for a further rotatable actuator according to the present invention is shown in the schematic side views of FIGS. 6A and 6B. In this case, actuator 60 comprises a swingable (movable) T-shaped element 62 connected via two L-shaped arms 68, 68' to two shape memory alloy wires 1, 2 connected to a surface of a stationary actuator frame 61, on which the T-shaped element 62 is mounted via a support 69 rotatably connected to the base of the T. The two L-shaped arms 68, 68' are connected at one end to two linear springs 65, 65' projecting from the underside of the crossbar of the T-shaped element 62, and at the other end to the SMA wires 1, 2 through movable frictional stoppers 3, 3'. Suitable resting elements 67, 67' are preferably present between the corners of arms 68, 68' and element 62, either mounted on the former or on the latter. Control of the engagement/disengagement of the movable frictional stoppers 3, 3' with nearby curved surfaces of the actuator frame 61 is respectively provided by springs 65, 65' and SMA wires 1, 2.

Figure 7A:
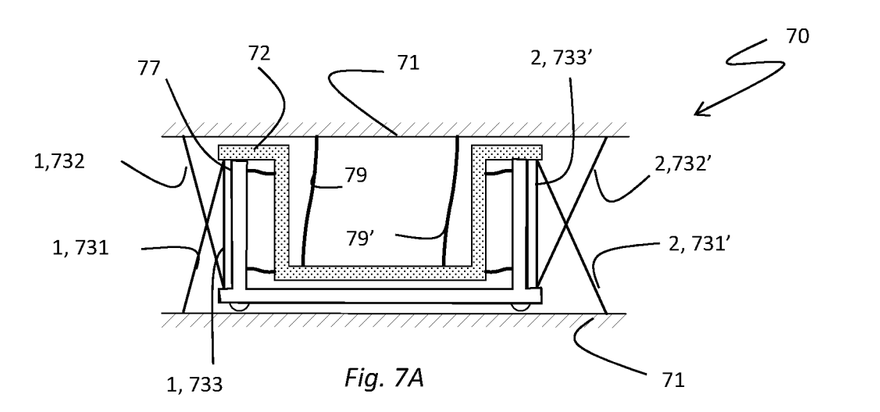
FIGS. 7A and 7B are schematic side views of a seventh embodiment of an actuator according to the present invention.
Figure 7B:
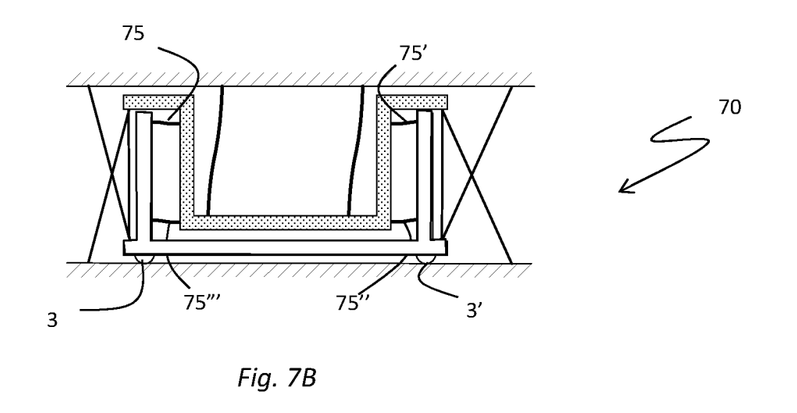

A seventh embodiment of an actuator according to the present invention is shown in the schematic side views of FIGS. 7A and 7B showing a movable element 72, shaped substantially like a U with a top flange, coupled to a linking frame 77, shaped substantially like a larger U on which the movable element 72 can rest with its top flange through intermediate springs 75, 75', 75", 75'''. The movement of the movable element 72 is controlled by a couple of antagonistic shape memory alloy wires 1, 2 each comprising three segments: a first segment 731, 731' for connecting a surface of a stationary frame 71 with the external top edge of the movable element 72, a second segment 732, 732' for connecting an opposite surface of frame 71 with the external bottom edge of the linking frame 77, and finally a third segment 733, 733' extending between said two segments.

The locked position of the actuator (FIG. 7B) is achieved when the frictional movable stoppers 3 and 3', mounted under the linking frame 77, are in contact with a surface of frame 71. Upon actuation of the shape memory alloy wires, more specifically thanks to the third segments 733, 733' of the shape memory alloy wires, the linking frame 77 is raised so that the movable frictional stoppers 3, 3' are no more in contact with said surface of frame 71 (FIG. 7A).

Similarly to FIGS. 1A-1B, flexible elements 79, 79' connect another surface of frame 101, more specifically the opposite surface with respect to the one with which frictional stoppers 3, 3' are in contact in the locked position, with the movable element 72 to provide support and also guide it in the travel direction while preventing its motion in other directions.

As in the case of the second embodiment of FIGS. 2A-2B, the linking frame 77 is taking care of the displacement of the movable stoppers, so that the movable element 72 just undergoes the lateral shift without the need of a vertical (secondary/parasitic) displacement of the movable element 72 in order to engage/disengage the movable stoppers 3, 3'.

As it is possible to appreciate by comparing the depiction of the movable elements in all the figures, the present invention is not limited to any specific shape or geometry for the movable element.

It is to be underlined that the embodiments shown in the previous figures are only exemplary of the scope of the present invention that is not limited to the embodiments illustrated in those figures but also encompasses other immediate variants, for example the shape memory alloy wires do not need to be identical in terms of length, diameter, composition or positioning and they could be asymmetrical, as previously mentioned.

With regards to the return elements (15, 15', ... 75", 75''') depicted in the various embodiments shown, preferred is the use of thin flexible elements (flexures), even though classic springs or other types of elastic elements, such as rubbers or elastomeric cushions may be used. Other passive elements for the movable element lock positioning may also be employed, such as, for example, permanent magnets in combination with ferromagnetic elements. When a bi-stable mechanism in the return element is being used, no minimum tension in the SMA wires needs to be maintained while positioning the movable element. All of the previous is commonly known to a person skilled in the art, for example suitable bi-stable mechanisms can be found in the 1994 book edited by Springer-Verlag "Konstruieren mit Konstruktionskatalogen. Band 2: Kataloge".

The examples in the figures generally use frictional contact locking of the movable element but form-locking contacting surfaces, yielding higher holding forces while restricting the number of possible locking positions of the movable element, may be employed instead. It is also essential for achieving the advantages of the present invention (suppression of a secondary movement) that the coupling of the movable element with a surface of the stationary frame through the movable stopper(s) to achieve locking is obtained indirectly, through a locking mechanism mounted on the return mechanism that provides the restoring force for the lock engagement (e.g. elements 15, 15' and 16, 16' in the first embodiment).

The guiding means of the movable element can not only comprise flexible elements, but also for example sliding or roller bearings.

The invention is not limited to any specific shape memory alloy material, even though preferred are Ni-Ti based alloys such as Nitinol described in U.S. Pat. Nos. 8,152,941, 9,315,880, 8,430,981.

Nitinol may exhibit alternately superelastic wire behavior or shape memory alloy behavior according to its processing. The properties of Nitinol and methods allowing to achieve them are widely known to those skilled in the art, see e.g. the article "A Study of the Properties of a High Temperature Binary Nitinol Alloy Above and Below its Martensite to Austenite Transformation Temperature" by Dennis W. Norwich presented at the SMST 2010 conference.

Nitinol may be used as such or its characteristics in terms of transition temperature may be tailored by adding elements such as Hf, Nb, Pt, Cu. The proper choice of material alloy and its characteristics are commonly known to a person skilled in the art, see for example:

http://memry.com/nitinol-iq/nitinol-fundamentals/transformation-temperatures

Also the shape memory alloy wires may be used "per se" or with a coating/sheath to improve their thermal management, i.e. their cooling after being actuated. The coating sheath may be uniform, such as described in the U.S. Pat. No. 9,068,561 that teaches how to manage residual heat by resorting to an electrically insulating coating which is a heat conductor, while U.S. Pat. No. 6,835,083 describes a shape memory alloy wire having an enclosing sheath capable to improve cooling after every actuation cycle. Also a coating with a suitable dispersion of phase changing materials, such as described in WO 2019/003198 in the applicant's name, may be advantageously employed.

With regards to the shape memory alloy wire diameter, it is advantageously comprised between 20 μm and 200 μm. It is also important to underline that as the shape memory alloy wires are real objects, departing from a circular section is possible, so the term "diameter" is to be intended as the diameter of the smallest enclosing circle.

The invention claimed is:

1. A shape memory alloy actuator comprising:
a movable element driven by at least first and second shape memory alloy wires arranged in an antagonistic configuration and concurrently determining the position of said movable element;
a stationary frame;
a locking mechanism to lock the movable element by indirectly coupling a surface of said stationary frame with the movable element, said indirect coupling being achieved through said locking mechanism; and
at least one return mechanism that provides the restoring force for the lock engagement,
wherein the locking mechanism includes at least one movable stopper that is movable between a locking position in which it engages either the movable element or said surface of the stationary frame and an unlocking position in which it does not engage either of them, said locking mechanism being mounted on said at least one return mechanism that provides the restoring force for the lock engagement, the disengagement of the at least one movable stopper being controlled by the actuation of at least one of said first and second shape memory alloy wires and its engagement being automatically performed by the restoring force provided by the at least one return mechanism upon cooling of the shape memory alloy wires as a consequence of said cooling.

2. The shape memory alloy actuator according to claim 1, wherein all the shape memory alloy wires have equal length and diameter.

3. The shape memory alloy actuator according to claim 1, wherein the movement imparted to the movable element by the actuation of said at least first and second shape memory alloy wires is linear or rotary or a combination thereof.

4. The shape memory alloy actuator according to claim 1, wherein each of said first and second shape memory alloy wires comprises a first segment and a second segment, wherein the first segments concurrently drive the movement of the movable element, and the disengagement of said at least one movable stopper is controlled by at least one of said first and second segments.

5. The shape memory alloy actuator according to claim 3, wherein each of said first and second shape memory alloy wires comprises a first segment and a second segment and both said first segments and second segments concurrently drive the movable element and control the disengagement of a plurality of movable stoppers.

6. The shape memory alloy actuator according to claim 3, wherein said first and second shape memory alloy wires are unsegmented wires directly connecting the movable element with the stationary frame.

7. The shape memory alloy actuator according to claim 3, further comprising a linking element physically connecting several stoppers with each other.

8. The shape memory alloy actuator according to claim 3, wherein one or more elastic elements, rolling bearings or sliding bearings connect the movable element with a surface of the stationary frame.

9. The shape memory alloy actuator according to claim 1, wherein the return mechanism for the engagement of the movable stoppers comprises elastic elements.

10. The shape memory alloy actuator according to claim 1, wherein the return mechanism for the engagement of the movable stoppers comprises one or more magnets.

11. The shape memory alloy actuator according to claim 1, wherein the return mechanism for the engagement of the movable stoppers comprises one or more bi-stable elements.

12. The shape memory alloy actuator according to claim 1, wherein said movable stoppers are selected from the group consisting of frictional stoppers and form factor stoppers.

13. The shape memory alloy actuator according to claim 10, wherein the one or more magnets are permanent magnets.

14. The shape memory alloy actuator according to claim 1, wherein said at least first and second shape memory alloy wires are Ni-Ti based alloy wires.

15. The shape memory alloy actuator according to claim 1, wherein said at least first and second shape memory alloy wires have a diameter of 20-200 μm.

16. The shape memory alloy actuator according to claim 2, wherein said at least first and second shape memory alloy wires are Ni-Ti based alloy wires.

17. The shape memory alloy actuator according to claim 2, wherein said at least first and second shape memory alloy wires have a diameter of 20-200 μm.

18. The shape memory alloy actuator according to claim 3, wherein said at least first and second shape memory alloy wires are Ni-Ti based alloy wires.

19. The shape memory alloy actuator according to claim 3, wherein said at least first and second shape memory alloy wires have a diameter of 20-200 μm.

* * * * *